United States Patent
Min

(10) Patent No.: US 9,051,884 B2
(45) Date of Patent: Jun. 9, 2015

(54) APPARATUS AND METHOD FOR CONTROLLING KICK DOWN OF ACCELERATOR PEDAL

(71) Applicants: Hyundai Motor Company, Seoul (KR); Kia Motors Corporation, Seoul (KR)

(72) Inventor: Jeong Seon Min, Gwangju (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/948,470

(22) Filed: Jul. 23, 2013

(65) Prior Publication Data

US 2014/0163818 A1 Jun. 12, 2014

(30) Foreign Application Priority Data

Dec. 6, 2012 (KR) .................. 10-2012-0140816

(51) Int. Cl.
| | |
|---|---|
| *G06F 7/00* | (2006.01) |
| *F02D 11/02* | (2006.01) |
| *B60W 30/02* | (2012.01) |
| *G05D 1/00* | (2006.01) |
| *G06F 17/10* | (2006.01) |
| *F16H 61/16* | (2006.01) |
| *G06F 11/07* | (2006.01) |
| *G06F 19/00* | (2011.01) |

(52) U.S. Cl.
CPC ............ *F02D 11/02* (2013.01); *G06F 11/0796* (2013.01); *G06F 11/0703* (2013.01); *B60W 30/02* (2013.01); *G06F 19/00* (2013.01)

(58) Field of Classification Search
CPC ............... B60W 30/02; G06F 11/0796; G06F 11/0703; G06F 19/00
USPC .................. 701/36, 42, 301; 477/125
See application file for complete search history.

(56) References Cited

U.S. PATENT DOCUMENTS

| | | | | |
|---|---|---|---|---|
| 2008/0086269 | A1* | 4/2008 | Joe et al. ................. | 701/301 |
| 2008/0176708 | A1* | 7/2008 | Tamai et al. ............. | 477/125 |
| 2009/0118907 | A1* | 5/2009 | Joe et al. ................. | 701/42 |
| 2013/0173111 | A1* | 7/2013 | Syed et al. .............. | 701/36 |

FOREIGN PATENT DOCUMENTS

| | | |
|---|---|---|
| JP | 2004-036873 A | 2/2004 |
| JP | 2010-052718 A | 3/2010 |
| JP | 2012-014713 A | 1/2012 |
| KR | 10-2004-0001774 A | 1/2004 |
| KR | 10-2009-0063016 A | 6/2009 |
| KR | 10-2010-0101816 A | 9/2010 |
| KR | 10-2011-0062017 | 6/2011 |
| KR | 10-2011-0062017 A | 6/2011 |
| KR | 10-2012-0026863 A | 3/2012 |
| KR | 10-2012-0061445 A | 6/2012 |

* cited by examiner

*Primary Examiner* — Helal A Algahaim
*Assistant Examiner* — Mahmoud Ismail
(74) *Attorney, Agent, or Firm* — Mintz Levin Cohn Ferris Glovsky and Popeo, P.C.; Peter F. Corless

(57) ABSTRACT

An apparatus and a method for controlling kick down of an accelerator pedal that includes a storage device that stores information of an tendency of the driver to operate an APS while a vehicle drives, and a control device for determining an tendency of the driver to operate the accelerator pedal based on the information of the APS operation that is input from the storage device and determining a control value to transmit a control signal to an operation device.

9 Claims, 2 Drawing Sheets

APPARATUS AND METHOD FOR CONTROLLING KICK DOWN OF ACCELERATOR PEDAL

CROSS-REFERENCE TO RELATED APPLICATION

This application claims priority under 35 U.S.C. §119 to Korean Patent Application No. 10-2012-0140816 filed on, Dec. 6, 2012, the disclosure of which is hereby incorporated by reference in its entirety.

BACKGROUND (a) Technical Field

The present invention relates to an apparatus and a method for controlling kick down of an accelerator pedal, and more particularly, to an apparatus and a method for controlling kick down of an accelerator pedal, by actively varying pedal effort of the accelerator pedal in accordance a driver's tendencies while operating an Accelerator Pedal System.

(b) Background Art

Generally, in an accelerator pedal which includes a pedal effort adjusting function for a vehicle, the pedal effort is adjusted by varying the length of a spring connected to a pedal arm. The length of the spring is varied normally in accordance with a motion of a motor.

However, as shown in FIG. 1, in these types of conventional accelerator pedals t, a controller is configured to control the motor only when specific external conditions, such as vehicle information, driving information, and driving road information, etc., are input to/identified by the controller so that the length of the spring is changed to vary the pedal effort actively. In this conventional configuration of the accelerator pedal, an average tendencies of a driver operating the accelerator pedal are not included as a condition for varying the pedal effort, and thus the driver operates the accelerator pedal often uncomfortably sense his habits or tendencies are not reflected.

Especially, with respect to a kick down performed frequently when operating the accelerator pedal, a driver may prefer to recognize the kick down, or on the contrary the driver may feel uncomfortable recognizing the kick down and instead prefers to ignore the kick down while operating the accelerator pedal in the driver's typical operation style.

Details described as the above background technology are merely representative for purpose of enhancing the understanding of background of the present invention, and should not be construed by those skilled in the art as limited to the known prior art.

SUMMARY OF THE DISCLOSURE

The present invention has been made in an effort to solve the above-described problems associated with the related art. It is an object of the present invention to provide an apparatus and a method that controls kick down of an accelerator pedal. More specifically, when a driver ignores the kick down of an accelerator pedal which includes a pedal effort adjusting function, accelerator pedal operation can be improved by varying downwardly the pedal effort to decrease the kick down force, and when a driver prefers to recognize the kick down, convenience of the accelerator pedal is provided until at a moment prior to the kick down by varying upwardly the pedal effort to increase the kick down force, and further kick down operation feeling can be provided evenly to the driver at a moment of the kick down.

In order to achieve the above object, an apparatus that controls the kick down of an accelerator pedal for a vehicle according to the present invention includes: a storage device (e.g., memory, hard drive, etc.) that stores information related to driver driver's tendencies in operating an accelerator pedal APS while a vehicle is being driven; and a controller configured to determine the tendencies of the driver to operate the accelerator pedal based on the information from APS operation input from the storage device and determine a control value in accordance with the determined results to transmit a control signal to an operation device.

The storage device may be configured to store an APS operation % as an accumulation value that is currently operated while a vehicle is being driven. The storage device may also store information related to the APS operation of a previous drives when the vehicle ignition is first turned on after being previously off.

The controller may further include a processor that is configured to learn and determine the tendencies of the driver to operate the accelerator pedal, and to determine a control value required to adjust a kick down force based on the determined result. Furthermore, the operation device may be an actuator including a motor or a gear operated to varying the pedal effort of the accelerator pedal.

A method for controlling kick down of an accelerator pedal for a vehicle according to the present invention is also provided. More specifically, information related to tendencies of a driver to operate an APS are continually stored while a driver is driving the vehicle. From this stored data, the tendencies of the driver to operate the accelerator pedal are determined based on the stored information of the APS operation and a control value required for adjusting kick down force is calculated/determined based on the tendencies of the driver. As a result of the control value, pedal effort of the accelerator pedal is varied based on information associated with the control value.

In some exemplary embodiments of the present invention, storing may include storing an APS operation % as an accumulation value that is currently operated while the vehicle drives and/or storing information of the APS operation of a previous driving when restarting a vehicle after starting-off.

Furthermore, determining the tendencies of the driver to operate the accelerator pedal may include determining that the driver has a tendency to ignore the kick down when the measured time is faster than a reference time when measuring the time to the moment the APS operation % exceeds a set A %, after setting the APS operation % as A % of a kick down arrival moment, and determining the driver has a tendency to recognize the kick down when the measured time is less than a reference time or the APS operation % does not arrive at the set A % within a reference time.

Even further, in some exemplary embodiments of the present invention determining the control value includes determining the tendency of the driver to operate the accelerator pedal as a tendency to ignore the kick down when the measured time is faster than a reference time when measuring the time taken to arrive at a target velocity of a vehicle from a current velocity thereof, and determining the tendency of the driver to operate the accelerator pedal is a tendency to recognize the kick down when the measured time is slower than a reference time or the current velocity of a vehicle does not arrive at the target velocity thereof within a reference time.

Additionally, when the tendency of the driver to operate the accelerator pedal is determined is the tendency to ignore the kick down, the control value is determined to be a value required to downwardly adjust (decrease) the kick down force, and when the tendency of the driver to operate the accelerator pedal is determined to be the tendency to recognize the kick down, the control value is determined to be a value required to upwardly adjust (increase) the kick down force.

Further, when the control value decreases the kick down force, the pedal effort required decreases, and when the control value increases the kick down force, the pedal effort of the accelerator pedal increases as well.

The pedal effort of the accelerator pedal according to the exemplary embodiment of the present invention may also be varied in phases to a set minimum value or maximum value set in accordance with repeated operation of the accelerator pedal by the driver, and when the tendency of the driver to operate the accelerator pedal is changed to other tendencies, pedal effort of the accelerator pedal is reversely varied in phases as well.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

DETAILED DESCRIPTION

Figure 1:
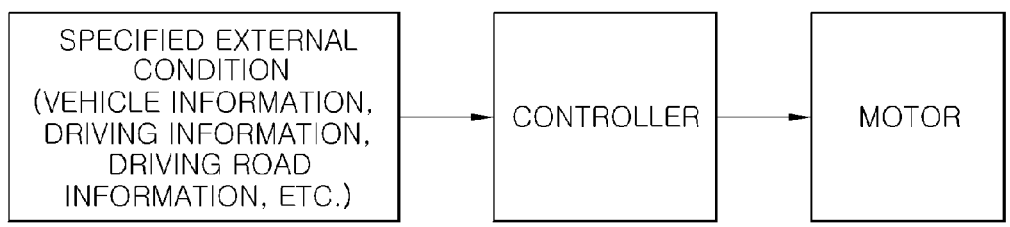
FIG. 1 is a schematic block diagram illustrating pedal effort adjusting procedures in an accelerator pedal according to a related art.

Hereinafter reference will now be made in detail to various embodiments of the present invention, examples of which are illustrated in the accompanying drawings and described below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and one or more processors. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An accelerator pedal used in an exemplary embodiment of the present invention is configured to operate with a pedal effort adjusting function and it may include a spring provided on one end of a pedal and an actuator such as a motor and a gear, etc., for providing power and force for variably adjusting the length of the spring.

In the accelerator pedal according to the exemplary embodiment of the present invention, as described above, a controller controlling accelerator pedal effort may be configured to determine a tendency of a driver to ignore kick down or to recognize kick down and adjust the force applied by the operating device based on the driver's tendencies.

Figure 2:
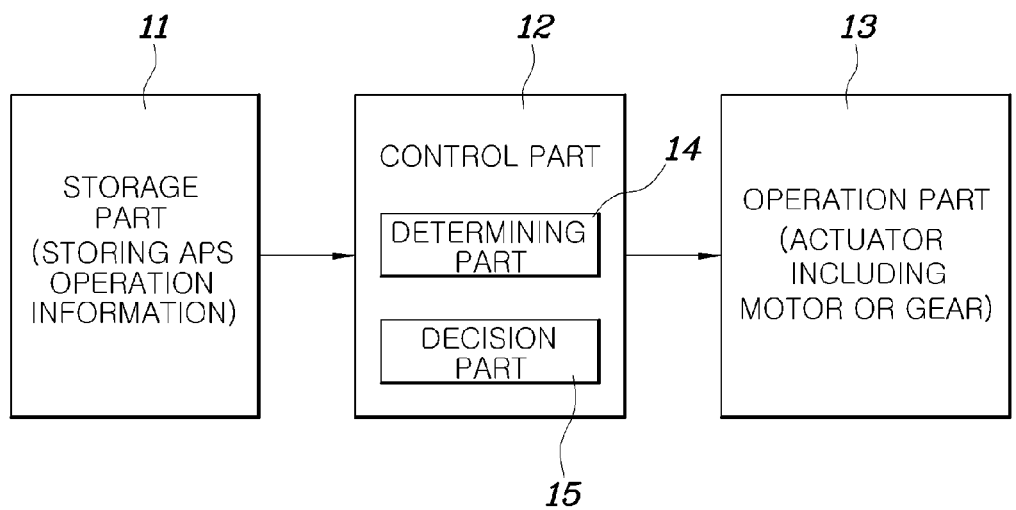
FIGS. 2 and 3 are a block diagram and a flow chart illustrating an apparatus and a method for controlling kick down of an accelerator pedal according to the exemplary embodiment of the present invention, respectively.
Figure 3:
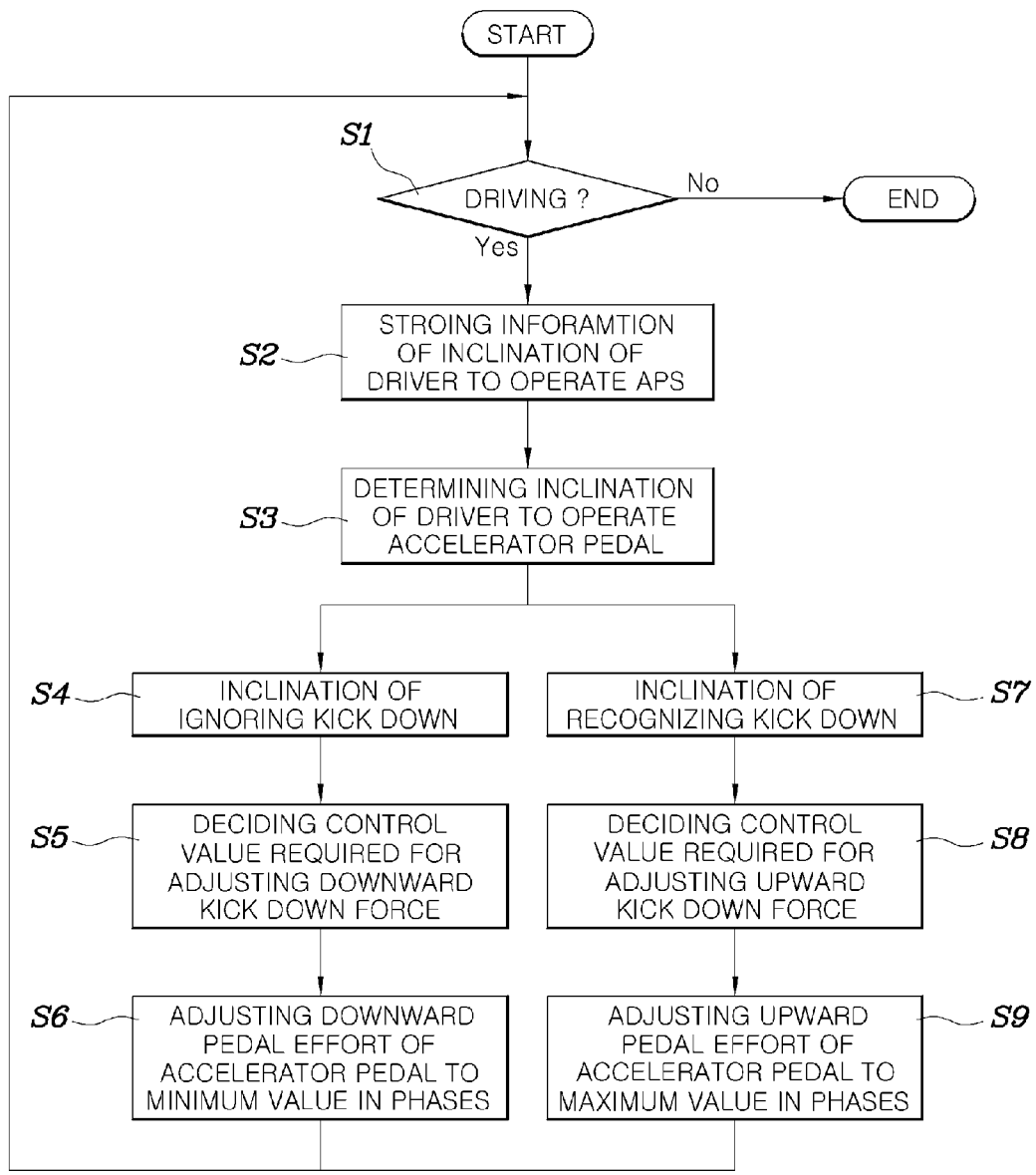

That is, as shown in FIGS. 2 and 3, an apparatus for controlling kick down of an accelerator pedal according to the exemplary embodiment of the present invention may include a storage device 11 that stores information related to the tendency of the driver to operate an Acceleration Position Sensor (hereinafter, referred to as "APS") while a vehicle is being driven, and a controller 12 configured to determine (via, e.g., a processor) a tendency of the driver to operate the accelerator pedal based on information from APS operation input from the storage device 11 and determine a control value based on the tendency of the driver that is transmitted in the form of a control signal to an operation device 13.

The storage device 11 may store APS operation % as an accumulation value that is currently operated while a vehicle is being driven and further store APS operation information of a previous drives when turning on the ignition of the vehicle.

The controller 12 may include a determining device 14 (e.g., a processor) that learns and determines the tendency of the driver to operate the accelerator pedal, and a decision device 15 (e.g., the same processor or different processor within the controller) that determines a control value required for adjusting kick down force based on the driver's determined tendency. The determining device 14 may be included in the controller 12, or to be provided separately from the controller 12. However, the determining device 14 in the illustrative embodiment of the present invention is illustrated as being included within the controller 12.

The operation device 13 may be operated to vary the pedal effort of the accelerator pedal may be an actuator including a motor and/or a gear wherein the actuator is operated to change the length of the spring thereby varying the pedal effort of the accelerator pedal.

Furthermore, a method for controlling kick down of an accelerator pedal according to the exemplary embodiment of the present invention may include: a storage step storing information of an tendency of the driver to operate the APS while driving a vehicle; a decision step determining a tendency of the driver to operate the accelerator pedal based on the stored APS operation information and determining a control value required to adjust a kick down force based on the driver's determined tendency; and a pedal effort adjusting step varying the pedal effort of the accelerator pedal based on information associated with the control value.

The storage step may be performed by storing APS operation % as an accumulation value that is currently operated while a vehicle is being driven and further storing APS operation information of a previous drives when initially turning on the vehicle.

Here, a method for determining the tendency of the driver to operate the accelerator pedal according to one embodiment of the present invention may be performed by setting the APS operation % as A % of a kick down arrival moment, determining the tendency of the driver to operate the accelerator pedal as a tendency to ignore the kick down when the measured time is faster than a reference time when measuring the time to when the moment the APS operation % exceeds the set A %, and determining the tendency of the driver to operate the accelerator pedal as a tendency to recognize the kick down when the measured time is slower than a reference time or the APS operation % does not arrive to the set A % within a reference time.

The A % of kick down arrival moment may be about 80% of the APS operation. However, it may be varied in accordance with different vehicle models and options and thus not preferable to define as a specified numerical value.

Further, a method for determining the tendency of the driver to operate the accelerator pedal according to another exemplary embodiment of the present invention may be performed by determining the tendency of the driver to operate the accelerator pedal as an tendency to ignore the kick down when the measured time is faster than a reference time when measuring the time taken to arrive at a target velocity of a vehicle from a current velocity thereof, and determining the tendency of the driver to operate the accelerator pedal as an tendency to recognize the kick down when the measured time is slower than a reference time or the current velocity of a vehicle does not arrive to the target velocity thereof within a reference time.

In the decision step, when the tendency of the driver to operate the accelerator pedal is determined to be the tendency to ignore the kick down, the control value is determined to be a value required for a decreasing the kick down force, and at the same time, in the pedal effort adjusting step, pedal effort of the accelerator pedal is decreased as a result.

Furthermore, in the decision step, when the tendency of the driver to operate the accelerator pedal is determined to be the tendency to recognize the kick down, the control value is determined to be a value required to increase the kick down force, and at the same time, in the pedal effort adjusting step, pedal effort of the accelerator pedal is increased.

Meanwhile, with respect to the tendency of the driver to operate the accelerator pedal, a specified tendency may continue in accordance with repeated operation of the accelerator pedal by the driver be monitored and changed or may be changed to other tendencies. More specifically, when the tendency of the driver to operate the accelerator pedal is continuously retained as the specified tendency, the pedal effort of the accelerator pedal may be varied in phases to a set minimum value or maximum value, and when the tendency of the driver to operate the accelerator pedal is changed, pedal effort of the accelerator pedal may be reversed to have varied phases.

For example, when the tendency of the driver to operate the accelerator pedal is determined once to be the tendency to ignore the kick down, the kick down force is decreased and the pedal effort of the accelerator pedal is simultaneously decreased, next when the tendency of the driver to operate the accelerator pedal is changed to the tendency to recognize the kick down by later operation of the accelerator pedal, the kick down force that is decreased is reversely increased and the pedal effort of the accelerator pedal that is decreased is also simultaneously increased.

Hereinafter, operation of an embodiment of the present invention will be described.

When a vehicle starts to drive (step S1) and a driver operates an accelerator pedal of the vehicle, information of an tendency of an APS operation by the drive is input to and stored to a storage device 11 (step S2). The information stored in the storage device 11 may include accumulation information of APS operation % that is currently operated while a vehicle is being driven and further APS operation information of a previous drive upon restarting the vehicle.

When the information is stored as described above, the controller 12 may determine an tendency of the driver to operate the accelerator pedal based on the stored information of the APS operation (step S3) wherein a determination of the tendency of the driver to operate the accelerator pedal may be performed as an example by setting the APS operation % as A % of a kick down arrival moment and measuring the time to the moment the APS operation % exceeds the set A %, and as another example by measuring the time taken to arrive at a target velocity of a vehicle from a current velocity thereof.

When the tendency of the driver to operate the accelerator pedal is determined to be a tendency to ignore kick down by the controller 12 using the method as describe above (step S4), the controller 12 may determine a control value required to decrease the kick down force (step S5) and transmit the determined control value to the operation device 13. As a result, the operator device 13 may operate an actuator including a motor and/or a gear in accordance with a control signal from the controller 12 and a length of a spring connected to the accelerator pedal may be changed by an operation of the actuator to decrease the pedal effort of the accelerator pedal (step S6).

Generally, when a length of the spring is changed to be longer, the pedal effort of the accelerator pedal may be decreased, that is, be slowly adjusted to a set minimum value in phases. When the pedal effort of the accelerator pedal is decreased, when the driver has a tendency to ignore the kick down, he/she may not feel the pedal effort greatly and thus do not need to use a large amount of force to operate the accelerator pedal thereby improving the ergonomics of the operation of the accelerator pedal and further reducing fatigue of the driver caused from operating the accelerator pedal. On the contrary, when the tendency of the driver to operate the accelerator pedal is determined to be an tendency to recognize kick down by the controller 12 (step S7), the controller 12 may determine a control value required f kick down force (step S8) and transmit the determined control value to the operation device 13.

As a result, the operator device 13 may operate an actuator including a motor and/or a gear in accordance with a control signal from the controller 12 and a length of a spring connected to the accelerator pedal may be changed by an operation of the actuator to increase the pedal effort of the accelerator pedal (step S9).

Generally, when the length of the spring is changed to be shorter, the pedal effort of the accelerator pedal may be adjusted upward, that is, be slowly adjusted to a set maximum value in phases. When the pedal effort of the accelerator pedal is adjusted upward, when the driver having the tendency to recognize the kick down operates the accelerator pedal, he/she may operate conveniently the accelerator pedal till a time point prior to the kick down and further feel surely operation of the kick down at a time point of the kick down to improve greatly convenience of operating the accelerator pedal.

As described above, the pedal effort of the accelerator pedal can be varied in accordance with the tendency of the driver to operate the accelerator pedal according to the embodiments of the present invention, and it can greatly improve the convenience related to the operation of the accelerator pedal by the driver, and greatly reduce the fatigue of the driver related to the operation of the accelerator pedal thereby giving the sure operation feeling of the kick down to the driver.

According to the exemplary embodiment of the present invention, when an tendency of a driver to operate an accelerator pedal is determined to be a tendency to ignore kick down, pedal effort of the accelerator pedal is varied downward to decrease kick down force, and when the tendency of a driver to operate an accelerator pedal is determined to be the tendency to ignore kick down, pedal effort of the accelerator pedal is varied upward to increase kick down force so that the driver can operate conveniently the accelerator pedal with reduced greatly. Especially sure operation feeling of the kick down can be given to the driver who prefers to recognize the kick down.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A method for controlling kick down of an accelerator pedal for a vehicle, the method comprising:
    storing, by a storage device, information of a tendency of a driver to operate an accelerator pedal sensor (APS) while a vehicle drives;
    determining, by a controller, the tendency of the driver to operate the accelerator pedal based on the stored information related to an APS operation,
    determining the tendency of the driver to operate the accelerator pedal as an tendency to ignore a kick down when a measured time is faster than a reference time when measuring the time to a moment an APS operation % exceeds a set A %, after setting the APS operation % as A % of a kick down arrival moment, and determining the tendency of the driver to operate the accelerator pedal as an tendency to recognize a kick down force when the measured time is slower than a reference time or the APS operation % does not arrive to the set A % within the reference time; and
    determining, by the controller, a control value required to adjust the kick down force; and
    varying pedal effort of the accelerator pedal based on information of the control value.

2. The method for controlling kick down of an accelerator pedal for a vehicle according to claim 1, wherein storing further comprises storing an APS operation % as an accumulation value that is currently operated while the vehicle drives.

3. The method for controlling kick down of an accelerator pedal for a vehicle according to claim 1, wherein storing further comprises storing information of the APS operation of a previous driving when restarting a vehicle after starting-off.

4. A method for controlling kick down of an accelerator pedal for a vehicle, the method comprising:
    storing, by a storage device, information of a tendency of a driver to operate an accelerator pedal sensor (APS) while a vehicle drives;
    determining, by a controller, the tendency of the driver to operate the accelerator pedal based on the stored information related to an APS operation,
    determining the tendency of the driver to operate the accelerator pedal as an tendency to ignore a kick down when a measured time is faster than a reference time when measuring the time taken to arrive to a target velocity of a vehicle from a current velocity thereof, and determining the tendency of the driver to operate the accelerator pedal as an tendency to recognize the kick down when the measured time is slower than a reference time or the current velocity of a vehicle does not arrive to the target velocity thereof within the reference time,
    determining, by the controller, a control value required to adjust a kick down force; and
    varying pedal effort of the accelerator pedal based on information of the control value.

5. The method for controlling kick down of an accelerator pedal for a vehicle according to claim 4, wherein storing further comprises storing an APS operation % as an accumulation value that is currently operated while the vehicle drives.

6. The method for controlling kick down of an accelerator pedal for a vehicle according to claim 4, wherein storing further comprises storing information of the APS operation of a previous driving when restarting a vehicle after starting-off.

7. A method for controlling kick down of an accelerator pedal for a vehicle, the method comprising:
    storing, by a storage device, information of a tendency of a driver to operate an accelerator pedal sensor (APS) while a vehicle drives;
    determining, by a controller, the tendency of the driver to operate the accelerator pedal based on the stored information related to an APS operation;
    determining, by the controller, a control value required to adjust a kick down force; and
    varying pedal effort of the accelerator pedal based on information of the control value,
    wherein, when the tendency of the driver to operate the accelerator pedal is determined as the tendency to ignore the kick down force, the control value is determined to be a value required to decrease the kick down force, and when the tendency of the driver to operate the accelerator pedal is determined as the tendency to recognize the kick down, the control value is determined as a value required to increase the kick down force,
    wherein when the control value is determined as the value required to decrease the kick down force, a pedal effort of the accelerator pedal is decreased, and when the control value is determined as the value required to increase the kick down force, the pedal effort of the accelerator pedal is increased,
    wherein the pedal effort of the accelerator pedal is varied in phases to a set minimum value or maximum value set based on repeated operation of the accelerator pedal by the driver, and when the tendency of the driver to operate the accelerator pedal is changed to other tendencies, the pedal effort of the accelerator pedal is reversely varied in phases.

8. The method for controlling kick down of an accelerator pedal for a vehicle according to claim 7, wherein storing further comprises storing an APS operation % as an accumulation value that is currently operated while the vehicle drives.

9. The method for controlling kick down of an accelerator pedal for a vehicle according to claim 7, wherein storing further comprises storing information of the APS operation of a previous driving when restarting a vehicle after starting-off.

* * * * *